Dec. 28, 1937.  H. K. KIMBLE ET AL  2,103,585
METHOD AND APPARATUS FOR SHAPING BODIES
Filed Feb. 21, 1935   2 Sheets-Sheet 1
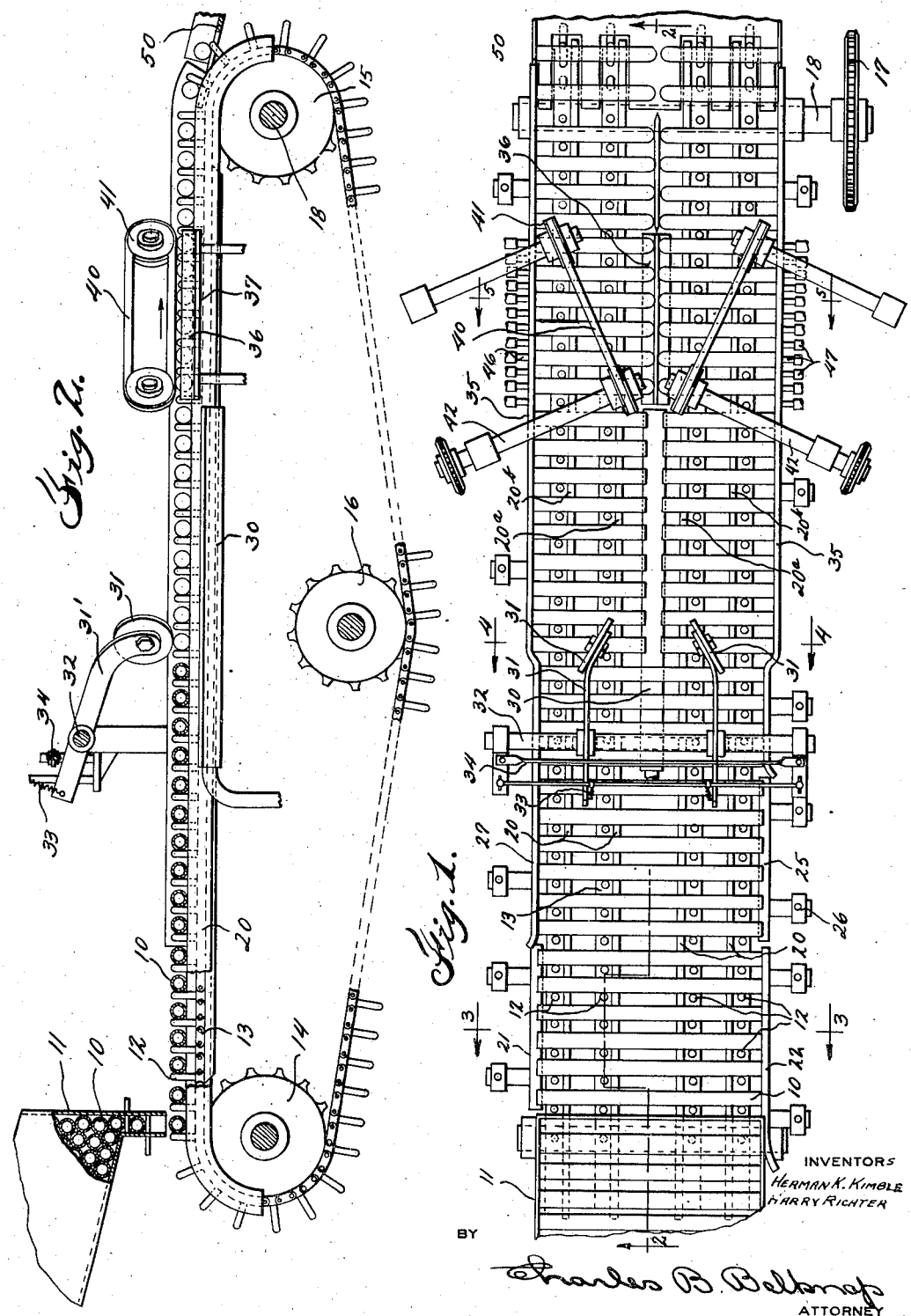
INVENTORS
Herman K. Kimble
Harry Richter
BY
Charles B. Belknap
ATTORNEY Dec. 28, 1937.   H. K. KIMBLE ET AL   2,103,585
METHOD AND APPARATUS FOR SHAPING BODIES
Filed Feb. 21, 1935   2 Sheets—Sheet 2
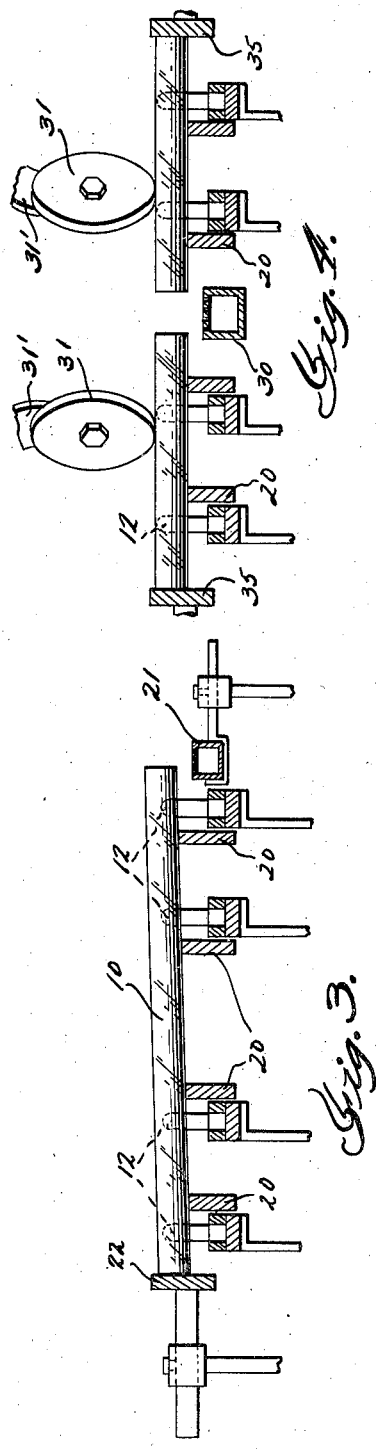
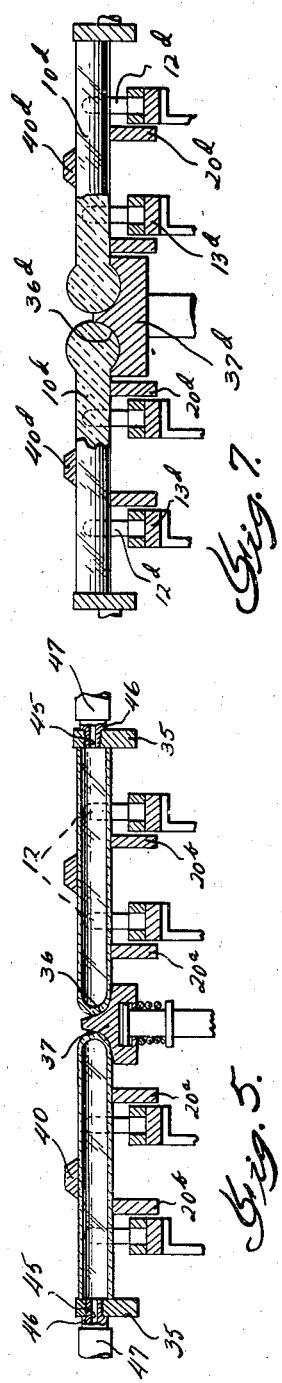
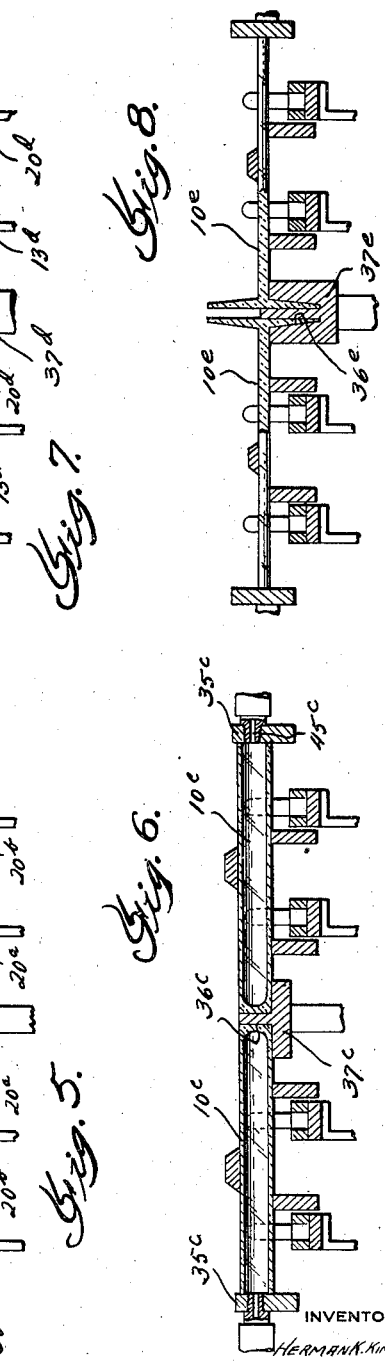
INVENTORS
HERMAN K. KIMBLE
HARRY RICHTER
BY
ATTORNEY Patented Dec. 28, 1937

2,103,585

UNITED STATES PATENT OFFICE 2,103,585

METHOD AND APPARATUS FOR SHAPING BODIES

Herman K. Kimble and Harry Richter, Vineland, N. J., assignors to Kimble Glass Company, Vineland, N. J., a corporation of Illinois Application February 21, 1935, Serial No. 7,530

17 Claims. (Cl. 49—7)

This invention relates to a method and apparatus for shaping bodies of plastic material such for example, as glass bodies heated to a state of plasticity.

One of the primary objects of this invention is to provide a method in which the desired shaping of a glass or like body may be effected during continuous movement of the body being shaped along a definite path of travel.

A further object of the invention is to provide a machine or an apparatus which will include means for effecting a travel of a body to be shaped along a definite path and which includes means arranged to engage the body to effect the desired shaping thereof during its travel along said path.

Numerous other objects and advantages of this invention will become more apparent as the following description proceeds particularly when reference is had to the accompanying drawings wherein Fig. 1 is a top or plan view of a machine constructed in accordance with the teachings of this invention, the view being highly diagrammatic and parts of the machine being omitted;

Fig. 2 is a longitudinal sectional view taken on the line 2—2 of Fig. 1, this view also being highly diagrammatic;

Fig. 3 is a transverse sectional view taken substantially on the line 3—3 of Fig. 1;

Fig. 4 is a transverse sectional view taken substantially on the line 4—4 of Fig. 1;

Fig. 5 is a transverse sectional view taken substantially on the line 5—5 of Fig. 1; and Figs. 6, 7 and 8 are views similar to Fig. 5 showing modified types of forming or shaping tools.

Heretofore in the shaping of glass bodies as for example, in the shaping of the ends of test tubes or the like, it has been the practice to impart intermittent travel to the body being shaped. Thus after several processing operations were performed on the body, it would be moved to the shaping station where it would be allowed to remain during the shaping or forming operation. Since it was necessary to periodically interrupt the travel of the body being formed, it is obvious that it required a substantial period of time for the body to pass through the processing or forming machine.

The present invention contemplates the provision of a method and apparatus whereby a glass body or the like may be effectively shaped during continuous movement of the glass body along a predetermined path of travel. In other words, the present invention contemplates the provision of means whereby the body may be properly processed without periodically interrupting its travel. Under the teachings of this invention the body being processed or shaped may be formed of glass or some other similar plastic substance, and may be either hollow or solid depending upon the type of body which is to be formed.

Referring then to the drawings wherein like reference characters designate corresponding parts throughout all views, there is shown in Figs. 1 to 5 inclusive a machine adapted for the forming and bottoming of test tubes or the like. As previously mentioned, the drawings are highly diagrammatic and parts of the machine are omitted in order that the essence of the invention will be more readily understood.

The stock or raw material may, as illustrated, be glass tubes 10 which are cut in uniform lengths from longer glass tubes or tubing. The tubes are fed in any desired manner from a hopper 11 between the fingers 12 carried by endless chains or conveyors 13. These chains extend over sprockets 14 and 15 and idler sprockets 16 and the chains are driven from a main drive gear 17 mounted on the shaft 18 of the sprockets 15.

The conveyor fingers 12 roll the tubes along rails 20 and by reference to Fig. 1 of the drawings, it will be noted that there are preferably provided four chains 13 and a rail 20 adjacent each chain.

During their initial travel through the machine, the left hand ends of the tubes are fire glazed by a burner 21 adjustably supported in any desired manner adjacent the left hand side of the machine. To properly position the tubes with reference to this burner, the rails 20 are preferably not level but are slightly higher adjacent the left hand side of the machine to direct the right ends of the tubes in engagement with a side rail 22 which is adjustably supported at the right hand side of the machine.

After the left hand ends of the tubes have been glazed, the right hand ends thereof are glazed by an elongated burner 25 positioned at the right hand side of the machine, this burner being adjustably supported by suitable supports 26. In this portion of the machine the rails adjacent the right side of the machine are slightly elevated so that the left hand ends of the tubes will engage a suitable guide rail 27 thus accurately positioning the tube ends to be glazed with reference to the burner 25.

After the right and left hand ends of the tubes have been glazed, the tubes while being continuously carried forward by the fingers 12 on the conveyors 13 are heated intermediate their ends by an elongated burner 30. As illustrated, this burner extends a substantial distance longitudinally of the machine and the initial part thereof heats the glass tubes sufficiently that they may be readily separated into two halves by any desired means which engages each tube on opposite sides of the heated portion thereof and draws the two parts of the tube away from each other.

To accomplish this result, there is diagrammatically disclosed skew rollers 31 carried by arms 31' rockably mounted on a cross shaft 32. Springs 33 engage the ends of the arms 31' and normally urge the skew rollers downwardly so that they will engage the tubes as they travel along the machine. There is provided a cross rail 34 which engages the arms 31' to limit downward movement of the skew rollers 31.

As the tubes pass under the skew rollers 31 they will be pulled into two half sections and the adjacent ends thereof will be closed by the pulling apart operation and by the flames from the burner 30 which are continuously directed on the pulled apart ends of the tubes. During the further travel of the tubes the outer ends engage side rails 35 while the inner closed ends are heated by the burner 30 so that the closed ends of the tubes will become sufficiently plastic to be shaped. Additionally, the continued heating of the closed ends of the tubes adds to the weight of the bottoms which are subsequently shaped on the ends of the tubes.

After the closed ends of the tubes have been sufficiently heated, the tubes are carried by the conveyor chains into engagement with elongated shaping surfaces 36. As illustrated in Figs. 1 and 5 of the drawings, these surfaces may be formed on opposite sides of a body 37 and the surfaces are elongated in the direction of travel of the tubes. The body 37 is disposed centrally of the machine in such a position that its shaping surfaces will engage the closed ends of the tubes during travel of the tubes longitudinally of the machine.

In order to speed up the rotation of the tubes during the interval of their engagement with the shaping surfaces 36, V-shaped belts 40 are provided, these belts being supported on suitable pulleys 41 and being rotatably driven by a suitable drive shaft 42. The belts are inclined with reference to the longitudinal axis of the machine with the result that the outer ends of the tubes are urged into engagement with the side rails 35.

When hollow bodies are being shaped, it is desirable to blow air into the bodies to blow the closed ends thereof into engagement with the shaping surfaces 36. For this purpose the portions of the side rails 35 which are opposite the shaping surfaces 36 are apertured as at 45 to receive discharge nipples 46 to which fluid supply pipes 47 are connected. The fluid used is preferably air under pressure and the pipes or conduits 47 are connected to suitable sources of supply of air under pressure in such a manner that the pressure of the air supplied to the tubes will gradually increase as the tubes are moved longitudinally of the shaping surfaces 36.

In actual practice, the air may initially be supplied to the tubes under a pressure of a few ounces and may be gradually increased until it is supplied to the tubes at a pressure of several pounds. This provides that while the ends of the tubes are quite plastic, they will be only lightly blown but that as the tubes become hardened, the pressure supplied to the interiors of the tubes is increased and even distribution of the glass results.

It is to be noted that if desired the body 37 carrying the shaping surfaces may be rigidly mounted as illustrated in Fig. 2 of the drawings, or may be resiliently mounted as illustrated in Fig. 5 of the drawings. In either event the inner rails 20$^a$ are preferably slightly lower than the outer rails 20$^b$ so that despite slight variations in the diameters of the bodies being treated, the inner ends thereof will engage the shaping surfaces 36. After the closed ends of the tubes have been shaped, they are carried on through the machine by the conveyors 13 and finally discharged onto a suitable discharge chute or the like 50.

As thus far described, it will be apparent that the invention provides a method of shaping glass or like bodies which consists broadly in heating the bodies and then engaging a suitable forming surface with the bodies during a substantial portion of the travel of the bodies along a definite path of travel.

More particularly, the invention provides means for continuously moving a body to be shaped, means for heating the body and an elongated shaping surface which is arranged to engage the body during a sufficient portion of its travel to effect the desired shaping of the body. It is to be noted that the shaping surface does not enclose the body being shaped but is rather flat in the direction of its length and transversely shaped to substantially the shape which it is desired to impart to the glass body.

It will be apparent that the invention further provides means whereby air under gradually increasing pressure may be supplied to hollow bodies such as test tubes, during the period that the closed ends thereof are in engagement with the shaping surfaces. It will be apparent that as the open ends of the tubes pass the openings 45, they will receive the air discharged through these openings and it is preferable that the openings are spaced so closely together that one or more of the openings is always discharging into the tubes.

It will be apparent further that the invention provides means not only for moving the bodies being formed along the shaping surfaces but also for rapidly rotating the bodies while they are in engagement with the shaping surfaces and while they are travelling longitudinally thereof.

While in the embodiment of the invention which has just been described, the shaping surfaces 36 have been illustrated as being rounded to impart round bottoms to the ends of the tubes being shaped, it will be apparent that these shaping surfaces may be of any desired shape to thus impart any shapes desired to the bodies being processed. Thus in Fig. 6 of the drawings, the tool body 37$^c$ is illustrated as having shaping surfaces 36$^c$ which are rectangular to thus form flat bottoms on the tubes 10$^c$. As in the first described form of construction, it will be understood that the tool body 37$^c$ extends a substantial distance longitudinally of the machine and that the side rails 35$^c$ are provided with suitable ports 45 by which air under pressure may be supplied to the interiors of the tubes.

Additionally, under the teachings of this invention, portions of solid glass or like bodies may also be shaped to any desired configuration. This is diagrammatically illustrated in Fig. 7 of the drawings wherein glass bars 10$^d$ are illustrated as being carried along on rails 20$^d$ by the fingers 12$^d$ of the conveyor chains 13$^d$. After the ends of the rods have been heated to the desired degree, they are rapidly rotated in engagement with semi-spherical shaping surfaces 36$^d$ which are formed in a body 37$^d$. It will of course be understood that the body 37$^d$ extends a substantial distance longitudinally of the machine and that the glass bodies are preferably rapidly rotated while the ends thereof are in engagement with the shaping surfaces as for example, by means of the belts 40$^d$.

In Fig. 8 of the invention, there is illustrated a tool 37$^e$ having shaping surfaces 36$^e$ adapted to form goblet base shaped ends on glass or like rods 10$^e$. While several different shapes of moulds have been illustrated, it will be readily apparent that the shaping surfaces may be given any desired configuration to impart any desired shape to the glass or like bodies which are moved into engagement with the same.

In the preceding description the shaping surfaces 36 have been defined as being "elongated" in the direction of travel of the bodies being shaped. It is believed apparent that the word "elongated" is a relative term and is in fact somewhat synonymous with the term "extending" since obviously the shaping surfaces need only be of sufficient length to provide for a proper shaping of the bodies being processed. Thus the surfaces might be longer than they are wide in the manner illustrated or if a substantial portion of the body is to be shaped and the body is of small diameter, the length of the shaping surfaces might be less than their width. In the specification and claims therefore, the word "elongated" should be construed as meaning extending a sufficient distance to effect the desired shaping of the body being processed.

From the above it will be apparent that the invention provides means whereby a glass body or the like to be shaped may be continuously moved along a predetermined path of travel. During its movement it may be processed and may be suitably shaped in any desired manner. It is unnecessary to interrupt the travel of the glass bodies during processing thereof with the result that the entire operation of processing the glass bodies may be speeded up.

While the invention has been described with some detail, it is to be understood that the description is for the purposes of illustration only and is not definitive of the limits of the inventive idea. The right is reserved to make such changes in the details of construction and in the steps of the method as will fall within the purview of the attached claims.

What we claim as our invention is:

1. The method of shaping the closed end of a tubular glass body which consists in heating the closed end of the body, causing the heated end of the body to move longitudinally of and in engagement with an elongated shaping surface, and discharging air into the opposite end of the tubular body to blow the heated end thereof into engagement with the shaping surface.

2. The method of shaping the closed end of a tubular glass body which consists in continuously moving the body along a predetermined path, heating the closed end of the body, engaging the closed end of the body with a forming tool which is elongated in the direction of travel of the glass body, and discharging air under gradually increasing pressure into the opposite end of the glass body while the heated end thereof is in engagement with the forming tool.

3. The method of shaping the closed end of a glass tube which consists in continuously moving the glass tube along a predetermined path, heating the closed end of the tube, causing the closed end of the glass tube to move longitudinally of and in engagement with a forming tool which is elongated in the direction of travel of the glass tube, rapidly rotating the glass tube while the end thereof is in engagement with the forming tool, and discharging air into the opposite end of the glass tube under gradually increasing pressure while the heated closed end thereof is in engagement with the forming tool.

4. The method of forming a pair of glass vessels having closed ends from a length of glass tubing which consists in continuously moving the length of glass tubing in a direction normal to its longitudinal axis, heating the length of glass tubing intermediate its ends during said movement, pulling apart the ends of the glass tubing on opposite sides of the heated portion to separate the length of glass tubing into two halves, continuing to move the two halves of the length of glass tubing in a direction normal to their longitudinal axes, heating the pulled apart ends of the length of glass tubing, causing the pulled apart ends of the length of glass tubing to move longitudinally of and in engagement with shaping surfaces which are elongated in the direction of travel of the half sections of the length of glass tubing, rotating the said sections of the length of glass tubing while the ends thereof are in engagement with the forming surfaces, and discharging air under gradually increasing pressure into the open ends of said half sections of the length of glass tubing to blow the heated closed ends thereof into engagement with the forming surfaces.

5. In a machine for shaping the closed end of a hollow glass body, means for continuously moving the hollow glass body along a predetermined path, means for heating the closed end of the glass body, a forming tool providing a shaping surface adapted for tangential contact with the end of the body, said shaping tool being elongated in the direction of travel of the glass body, and fluid discharge means extending for a substantial distance in the direction of travel of the glass body and arranged to blow the end of the body into engagement with the said shaping surface during the uninterrupted movement of the body longitudinally of the shaping surface.

6. In a machine for shaping the closed end of a hollow glass body, a forming tool providing an elongated shaping surface adapted for tangential contact with the end of the body, means for causing the end of the body to be shaped to travel longitudinally of said surface and in engagement with the same, means to rotate the body to bring all portions of the end thereof into engagement with the shaping surface, and means to blow the end of the body into engagement with the shaping surface, said last mentioned means including a plurality of fluid discharge nozzles so arranged that as the body travels longitudinally of the shaping surface the interior of the body is placed in communication successively with the nozzles.

7. In a machine for shaping the closed end of a glass tube, means for continuously moving the glass tube in a direction normal to its longitudinal axis, means for heating the closed end of the glass tube, a forming tool providing a shaping surface adapted for tangential contact with the end of the body, said shaping surface being elongated in the direction of travel of the glass tube, means to rotate the glass tube with the end thereof in engagement with said shaping surface, means providing for travel of the end of the glass tube longitudinally of the shaping surface, and means for supplying air under gradually increasing pressure to the interior of the glass tube.

8. In a machine of the class described, a tool providing an elongated shaping surface, a rail spaced from and arranged parallel to said shaping surface, means for causing a glass tube closed at its one end to travel between said shaping surface and said rail with the closed end of the tube in engagement with the shaping surface, means for rotating the tube while the closed end thereof is in engagement with the shaping surface, and a plurality of air supply conduits opening through said rail for supplying air under pressure to the interior of the glass tube while the closed end thereof is in engagement with the shaping surface.

9. In a machine for shaping a glass body, means for heating the body, means for rotating the body about its axis, a tool having a shaping surface shaped in the direction of the axis of rotation of the body to the contour to be imparted to the body and extending over the end of the body, and means for moving the glass body longitudinally of said shaping surface while the body is in engagement with the shaping surface.

10. Those steps in the method of bottoming a plastic body which consist in rotating the body and continuously moving the same in a direction normal to its axis to travel longitudinally of and with the bottom of the body in engagement with an elongated shaping surface which is shaped in the direction of rotation of the body to the contour to be imparted to the body to progressively shape the bottom during said continuous movement.

11. Those steps in the method of bottoming a glass body which consist in continuously moving the body along a predetermined path, heating the portion of the body to be bottomed, simultaneously rotating the body and continuously moving the same in a direction normal to its axis causing the heated portion of the body to travel longitudinally of and in engagement with an elongated shaping surface which extends up over the end of the body and which is shaped in a direction normal to the direction of travel of the body to the contour to be imparted to the bottom to progressively shape the bottom during said continuous movement.

12. In a machine for shaping a plastic body, means for continuously moving the body along a predetermined path, a tool having a shaping surface shaped in a direction normal to the direction of movement of the body to the contour to be imparted to the body, means for moving the body longitudinally of said shaping surface while the body is in engagement with the shaping surface and means for rotating the body while the same is in engagement with the shaping surface.

13. In a machine for shaping a glass body, means for moving the glass body along a predetermined path, a tool providing a shaping surface elongated in the direction of travel of the body, said shaping surface being shaped in a direction normal to the direction of travel of the body to the contour of the body and extending over the end of the body, and means for moving the glass body longitudinally of said shaping surface while the body is in engagement with the shaping surface.

14. Those steps in the method of shaping a hollow glass body which consist in heating the portion of the body to be shaped, and discharging a fluid under gradually increasing pressure into the interior of the glass body.

15. Those steps in the method of shaping a hollow glass body which consist in heating the portion of the glass body to be shaped, continuously moving the glass body along a predetermined path, and discharging a fluid under gradually increasing pressure into the interior of the glass body during the movement thereof along said path.

16. In a machine for shaping a hollow glass body, which body is provided with an opening by which access may be had to the interior thereof, means for continuously moving the hollow glass body along a predetermined path, and means disposed adjacent the path of travel of the hollow glass body and extending a substantial distance in the direction of travel of the glass body arranged to discharge a fluid under pressure into the interior of the glass body through the opening therein.

17. In a machine for shaping a hollow glass body, which body has an opening by which access may be had to the interior thereof, means for continuously moving the glass body along a predetermined path, a rail disposed parallel to the path of travel of the glass body, said rail having a plurality of discharge openings, means for supplying a fluid under pressure to said discharge openings, and means for urging the body in engagement with the rail with the opening therein in a position to successively register with the openings in the rail during travel of the body.

HERMAN K. KIMBLE.
HARRY RICHTER.